Figure 1:
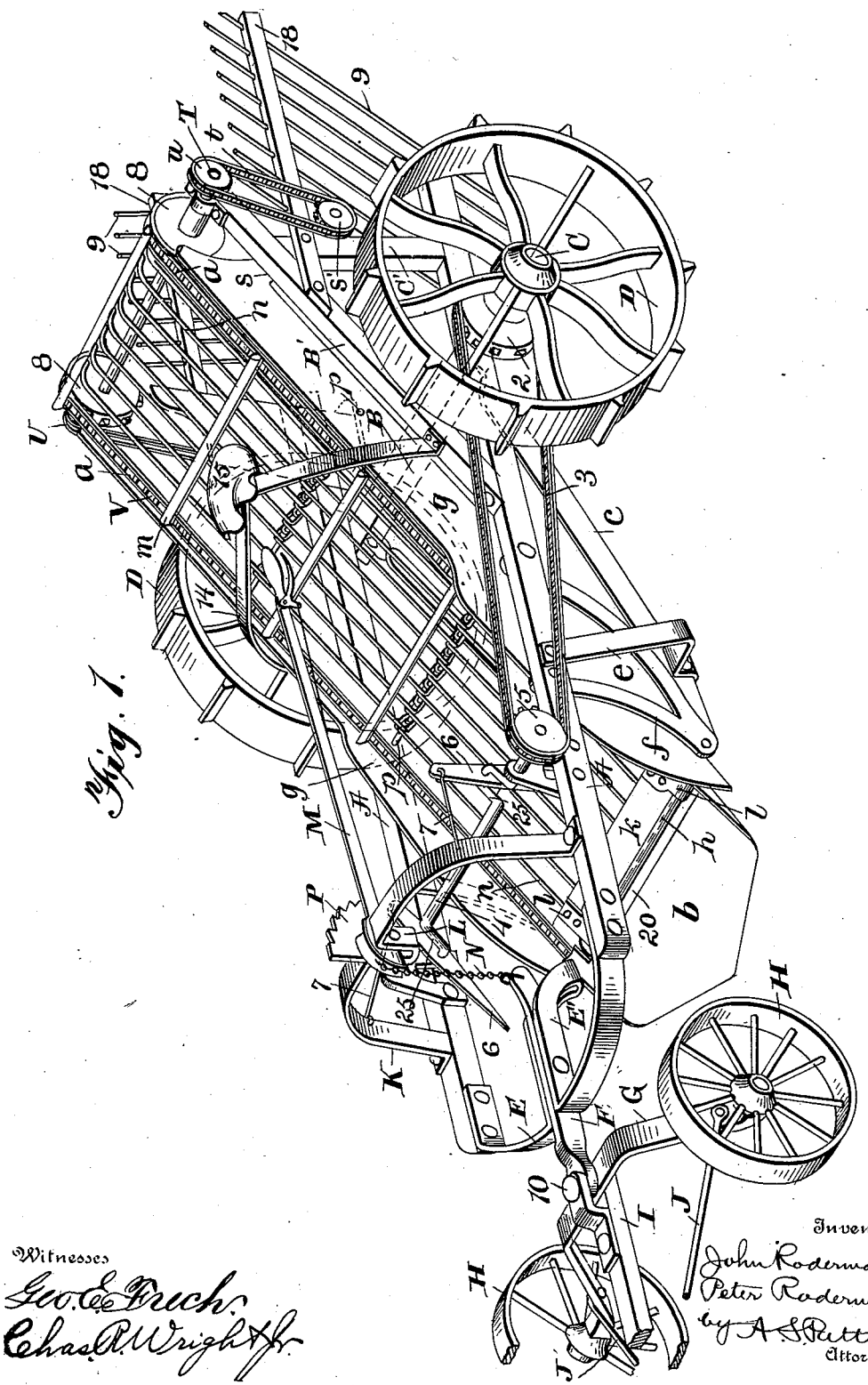

No. 668,611. Patented Feb. 19, 1901.
J. & P. RADERMACHER.
POTATO DIGGER.
(Application filed Apr. 6, 1900.)

(No Model.) 3 Sheets—Sheet 1.

Witnesses
Geo. E. Frech.
Chas. R. Wright Jr.

Inventors:
John Radermacher
Peter Radermacher
by A. S. Pattison
Attorney

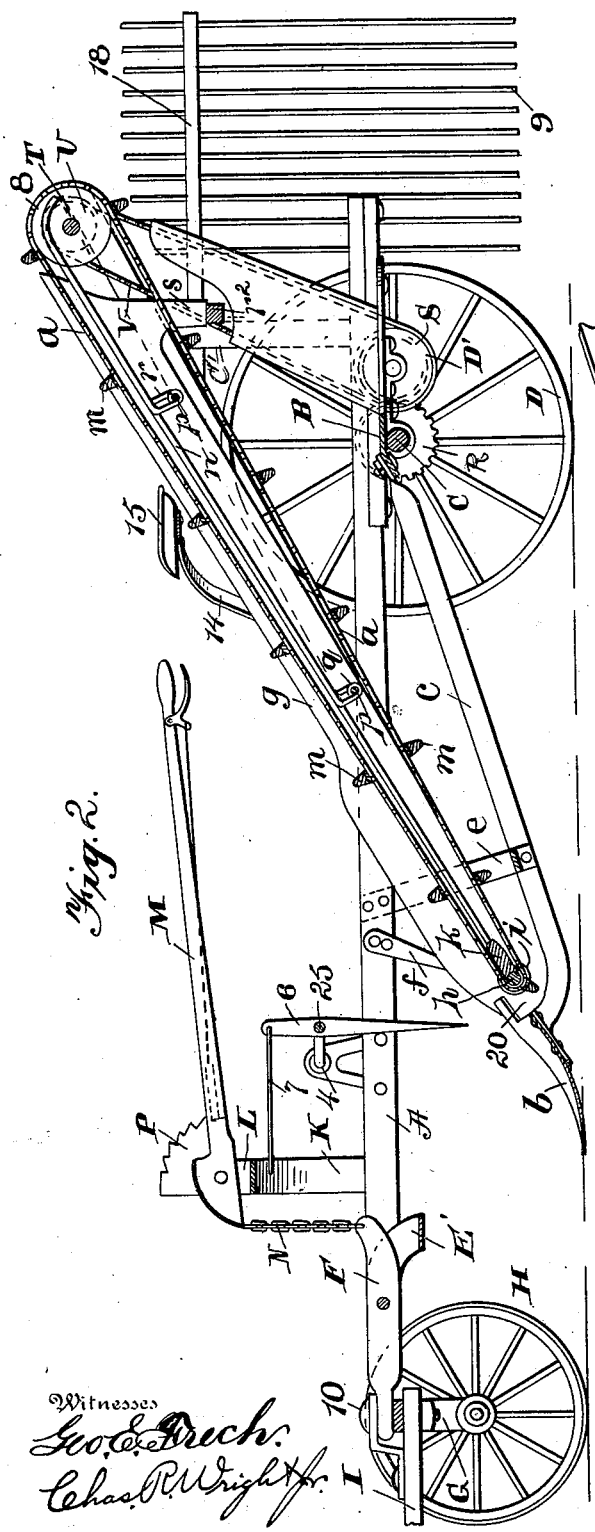
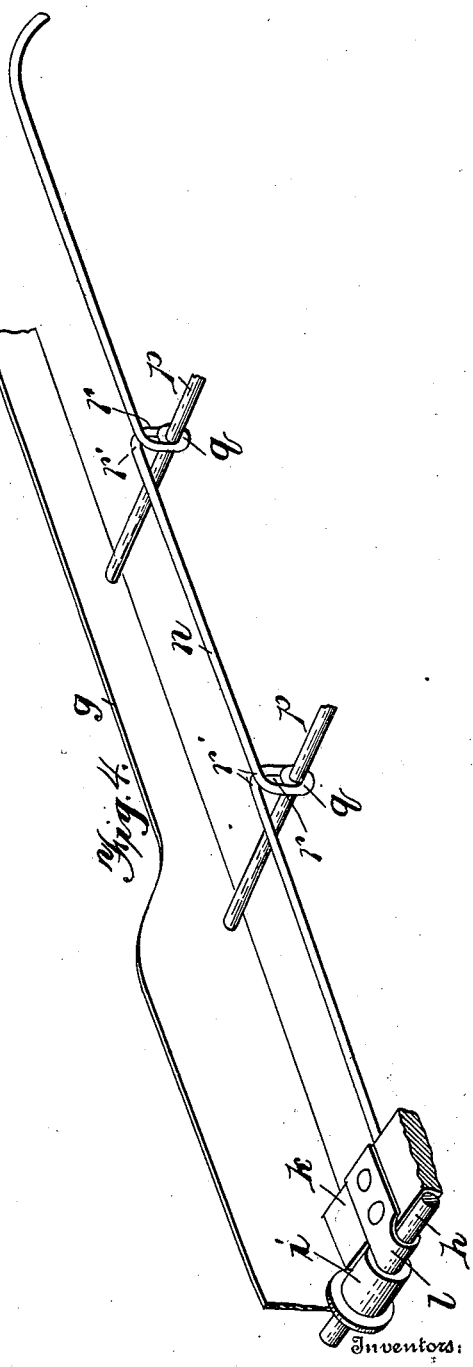

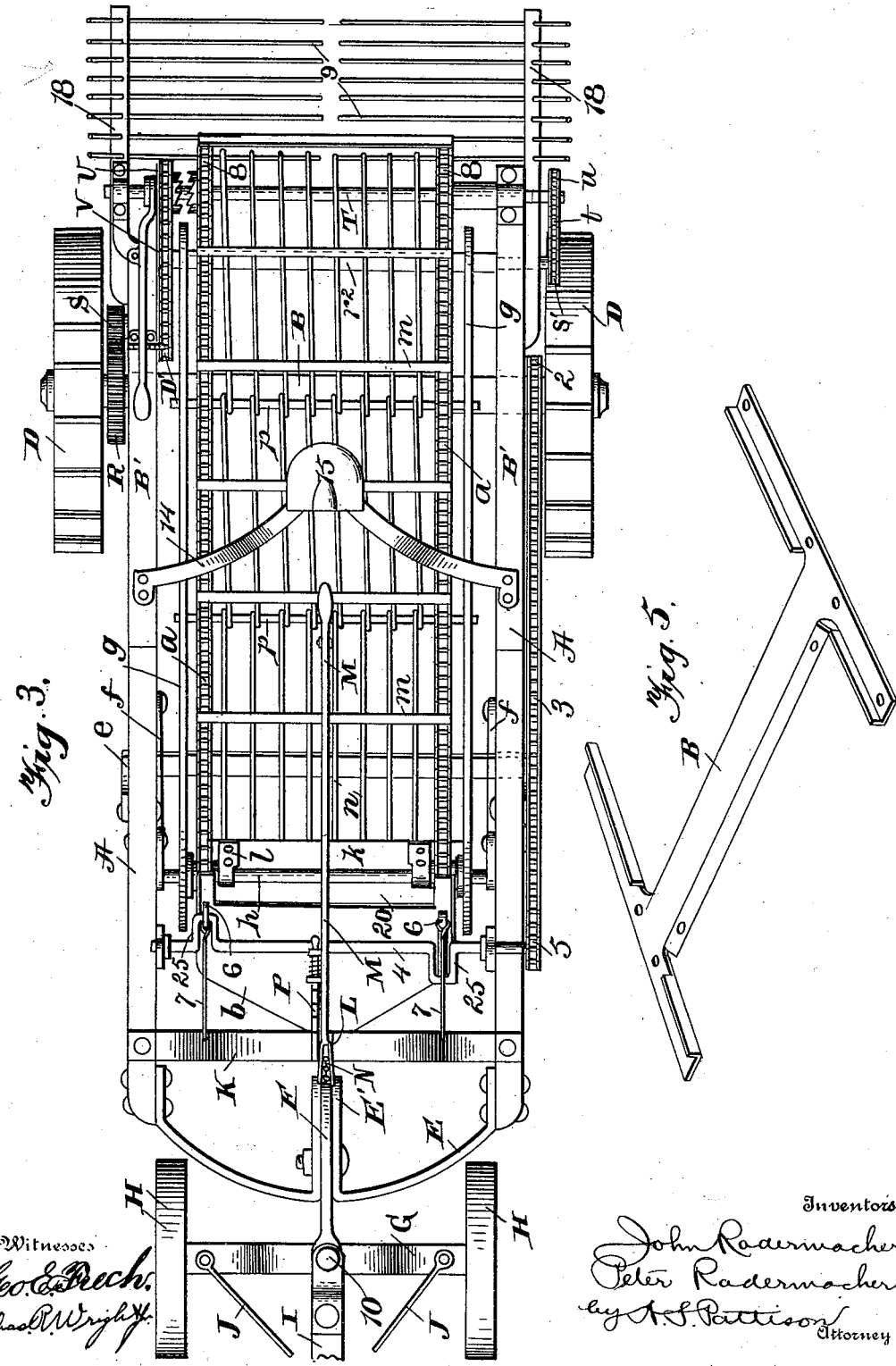

UNITED STATES PATENT OFFICE.

JOHN RADERMACHER, OF WRIGHTSTOWN, AND PETER RADERMACHER, OF KAUKAUNA, WISCONSIN.

POTATO-DIGGER.

SPECIFICATION forming part of Letters Patent No. 668,611, dated February 19, 1901.

Application filed April 6, 1900. Serial No. 11,832. (No model.)

*To all whom it may concern:*

Be it known that we, JOHN RADERMACHER, residing at Wrightstown, in the county of Brown, and PETER RADERMACHER, residing at Kaukauna, in the county of Outagamie, State of Wisconsin, citizens of the United States, have invented new and useful Improvements in Potato-Diggers, of which the following is a specification.

Our invention relates to improvements in potato-diggers, all of which will be fully described hereinafter and particularly referred to in the claims.

The object of our invention is to provide a potato-digger which will dig the potatoes, separate them from the dirt, and deliver them in a row to be afterward gathered up.

In the accompanying drawings, Figure 1 is a perspective view of a potato-digger embodying our invention. Fig. 2 is a vertical longitudinal central sectional view of the same. Fig. 3 is a top plan view of the same. Fig. 4 is a detached perspective view of one edge of the elevator-frame and its side board. Fig. 5 is a detached perspective view of the rear end connecting-plate, which extends longitudinally of the driving-shaft.

Referring now to the drawings, A indicates the side beams of the main frame of our machine, and B a connecting-plate which is constructed as shown in Fig. 5, the said connecting-plate having its laterally-extending ends bolted to the side beams A and a stem portion extending over the top of the driving-shaft C, the said driving-shaft being journaled to the said connecting-plate in any desired manner. Loosely placed upon the ends of the driving-shaft C are the driving-wheels D, and these driving-wheels D will be provided with any desired form of clutch for the purpose of throwing them in and out of gear with the driving-shaft. We prefer to use a form of clutch which is inclosed within the hubs of the driving-wheels; but, forming no part of our present invention, it is not here specifically shown or described.

The forward ends of the beams A of the main frame of the machine are connected by the essentially W-shaped bar E, formed of flat metal, as here shown, the said bar having an inwardly-extending U-shaped loop E' at its center, the said loop extending rearwardly and receiving between it the intermediately-pivoted arm or draft-bar F. The forward end of this draft-bar F is pivotally connected, by means of a king-bolt 10, with a wheel-arch G, the wheels H being suitably journaled to the ends of the said arch. A suitable tongue I is connected to the central portion of this arch G, and the tongue is connected by means of the braces J for the purpose of making the tongue laterally rigid with the arch G, by means of which the implement may be readily guided, as will be readily understood.

For the purpose of enabling the operator to elevate or lower the front end of the main frame of the machine, and thus regulate the depth at which the plow b shall enter the ground to suit the conditions of the particular work being performed, we provide the forward portion of the main frame with an essentially U-shaped arch K, having at its center a depending U-shaped portion L, within which is pivoted a lever M. Connected with the short end of this lever and the inner end of the draft-bar F is a suitable connection N, here shown in the form of a chain. Supported by the arch K, at one side of the lever M, is a notched segment P, with which a ratchet is caused to engage in the usual manner and which is so well understood by those skilled in the art that any definite description or illustration thereof is not necessary. By means of this construction it will be readily understood that the operator is enabled by depressing the lever to raise the forward end of the frame or by releasing the lever to permit the forward end of the frame to drop, and thus raise or lower the plow or scoop b and in turn regulate the depth at which it shall enter the soil.

For the purpose of limiting the downward movement of the front end of the frame in respect to the supporting and guiding arch G and its supporting-wheels H we have the inner end of the draft-bar F to extend sufficiently in to engage the arch or connecting portion of the U-shaped loop E' in the center of the connecting-bar E at the front ends of the beams A, as will be readily understood from Figs. 1 and 2.

Suitably connected with one end of the driving-shaft C, between one of the wheels D and the adjacent beam A, is a suitable gear-wheel R, meshing with a gear-wheel S, (shown in dotted lines, Fig. 2,) which is journaled to the beam A.

Projecting upwardly and rearwardly are the inclined beams B', which have their outer ends supported and braced by depending braces C', having their lower ends abutting against the rear ends of the beams A. Journaled to the upper ends of the inclined beams B' is a shaft T, the said shaft T carrying at one end a sprocket-wheel U, and passing around the sprocket-wheel D', which is operatively connected with the gear-wheel S, is a chain V, by means of which the shaft T is caused to revolve through the medium of the driving-shaft and the driving-wheels, which are adapted to be operatively connected therewith, as before stated.

The plow or scoop $b$, hereinbefore referred to, is supported by means of the forwardly-extending flat metallic bars $c$, to the forward ends of which is bolted the said plow or scoop, and the rear ends of these bars $c$ are suitably bolted to the ends of the transverse plate B, which is situated just above the driving-axle and to which the driving-axle is journaled. The forward ends of these bars $c$ are supported and braced by the depending brackets $e$, which have their upper ends suitably connected with the side beams A and their lower ends connected with the bars C near their front ends.

There is arranged just in rear of the plow or scoop $b$ an inclined elevator, which is adapted to receive the vines, potatoes, and dirt scooped up by the scoop $b$ and to convey them to the upper end of the elevator, and the elevator is so constructed as to permit of a vertical vibration thereof for the purpose of shaking the dirt from the potatoes and vines as they are being elevated, thus serving to separate the dirt therefrom and also to lighten the load of the machine. Supported at the front portion of the machine and just in rear of the scoop $b$ by means of depending brackets $f$ is a shaft $h$. The elevator consists of the side boards $g$, which are connected at their lower ends by means of a transverse board $k$ and at intermediate points throughout their lengths by means of the transverse rods $p$. $n$ represents the rods which constitute the incline plane, which serves as the supporting element for the potatoes and vines as they are being elevated thereon. These wires are arranged in parallel series, as clearly shown in Fig. 3, side by side and have their lower ends attached to the transverse bar $k$ and their upper ends extending to and beyond the shaft and slightly curved downward, as illustrated. Attention is directed to the particular construction of these bars $n$, which constitute the incline plane. These bars are provided with the intermediate eyes $q$, which are adapted to receive the supporting-rods $p$ and are also provided with the elongated upwardly-extending portions $r$ for the purpose of carrying the wires $n$ up above the supporting-rods $p$, and then there is a short turn $r'$, which serves to enable us to form an inclined plane of these rods, which are practically unbroken, in that the formation of these rods bent as just described forms an incline plane which has the longitudinal portions thereof in contact with each other and in exactly the same plane, as clearly illustrated in Figs. 2 and 4. The transverse bar $k$, as before stated, forms the lower end of the inclined plane, and this bar is pivoted with the shaft $h$ by means of suitable loops $l$, which leaves the upper end of the inclined plane or elevator free vertical movement for the purpose of being vibrated as the vines and potatoes are being elevated thereon. The upper end of this inclined plane or elevator is supported upon an angular shaft $r^2$ by means of the depending portions $s$ of the side boards $g$, which are in contact with this said angular shaft, as clearly shown in Fig. 2. Situated upon one end of this angular shaft is a sprocket-wheel $s'$, and upon the projecting end of the shaft T is a sprocket-wheel $u$, and passing around the sprockets $u$ and $s'$ is a sprocket-chain $t$, whereby motion is given to the angular shaft when the machine is in operation.

The potatoes, vines, and dirt which are scooped by the scoop $b$ are carried upon the lower end of the inclined plane and are then caught by means of a traveling elevating mechanism, which we will now describe. This elevating mechanism consists of sprocket-chains $a$, which pass around sprocket-wheels 8, carried by the shaft T at the upper end of the inclined plane, but independent thereof, and pass around the pulleys or sheaves $i$, carried by the shaft $h$ at the lower ends of the inclined plane. Connecting these chains at suitable intervals are transversely-arranged slats $m$, which serve to catch the dirt, potatoes, and vines and carry them along up the incline plane as they pass from the scoop $b$.

For the purpose of keeping the vines and rubbish from blocking the scoop $b$, and also for the purpose of keeping the lower end of the elevator clear of vines and other rubbish, which would likely lodge thereon, we provide a transverse crank-shaft 4, situated just above the lower end of the elevator and adjacent to the scoop $b$, and this shaft is revolved by means of a sprocket-chain 3, passing around a sprocket-wheel 2 upon the drive-shaft C and also around a sprocket-wheel 5, carried by the crank-shaft 4. This crank-shaft 4 is provided with two crank-arms 25, which carry what we term "kicker-levers" 6, the lower ends of the said kicker-levers being pointed and preferably sharpened and their upper ends being connected with the arch K through the medium of suitable links 7. From this arrangement it will be seen as the machine is in operation these arms are being carried forward and up the incline and serve to carry with them the vines and to break them loose from any entanglements which they may assume and to break them away from any point upon which they may hang either upon the scoop or the lower end of the elevator. These kickers serve a very essential and efficient portion of our machine in that the said kicker-levers are situated in lines above opposite sides of the plow $b$ in contradistinction to placing them adjacent to the center of the plow, for the reason that these kickers are situated as here shown in relation to the opposite sides of the plow, so that they will be effective in cutting and breaking away the vines that hang to the edges of the plow, which is a difficulty which has heretofore existed in machines of this character. They are so situated also for the purpose of preventing the cutting and slicing of the potatoes, which would occur if they were placed in the center of the plow.

Attention is directed to the fact that just in rear of the scoop we provide a space 20 between its rear edge and the lower end of the elevator, which is constituted by the transverse board or bar $k$. The object of this space is to permit considerable of the dirt to fall therethrough, and thus prevent the necessity of disposing of this dirt as it passes along up the elevator and serves to very materially lighten the load of the machine and therefore to make it work easier. As the dirt, vines, and potatoes are being carried up the incline plane of the elevator the elevator is being continually and rapidly vibrated by means of the transversely-arranged angular shaft $r^2$, before described, and this serves to shake the dirt from the vines and the potatoes, and it is found that the dirt is practically removed therefrom when they reach the upper end of the elevator.

For the purpose of preventing the potatoes from being scattered all around when they are delivered from the upper end of the elevator and also for the purpose of assisting to still further remove foreign matter, such as dirt or rubbish, therefrom we provide the machine just in rear of and below the upper end of the elevator with inclined racks composed of inwardly and downwardly extending bars 9, which are supported by rearwardly-extending beams 18. These bars 9 approach very nearly together at their lower ends, as shown in Fig. 3, and extend inward at an incline, as shown in Fig. 1. From this description it will be noted that as the elevator delivers the dirt, potatoes, and vines to this rack as they fall from the elevator the dirt is still further loosened therefrom, and in the striking of the rack the dirt will fall therethrough, while the potatoes are gathered together and roll down to the center of these rods and fall out between their lower ends in a row as the machine passes along, thus putting them in a position from which they can be quickly and readily gathered.

A suitable seat 15 is supported upon the arch 14 and in a position where the bar M is convenient for operation and by means of which the driver is enabled to readily and quickly regulate the depth at which the scoop is being run.

We find from actual practice that a machine built in accordance with the drawings and description herein given is very efficient in the digging and the separating of the potatoes and that when dug they are delivered in a row with the dirt separated therefrom and from the vines.

Having thus described our invention, what we claim, and desire to secure by Letters Patent, is—

1. An inclined plane forming part of an elevator for potato-diggers comprising a frame having transversely-arranged bars, and longitudinally-arranged rods having eyes $u$ formed intermediate of their ends, and receiving the transversely-arranged bars, and said eyes having upwardly-projecting portions $r$ bent inward adjacent to each other, and then bent in opposite directions to carry their longitudinal portions in the same plane, substantially as described.

2. A potato-digger comprising a frame, driving-wheels, an inclined elevator, a plow situated at the lower end of the elevator, a transverse crank-shaft supported by the frame above the plow, the said shaft having cranks located in lines above opposite sides of the said plow, kicker-arms intermediately pivoted to said cranks with their lower ends arranged edgewise in respect to their line of movement and located above and adapted to cut and remove the vines from opposite sides of the plow, the crank-shaft carrying a sprocket-wheel, the drive-shaft carrying a sprocket-wheel, and a sprocket-chain connecting the said sprocket-wheels, whereby direct connection between the drive-shaft and the picker-shaft is effected for giving the necessary power in operating the picker-shafts for removing the vines from opposite edges of the plow, substantially as described.

3. An inclined plane forming part of an elevator for potato-diggers comprising side boards having transversely-arranged bars and longitudinally-arranged rods having eyes formed intermediate of their ends and receiving the said transversely-arranged bars, a transverse block near the lower end of said side boards and receiving the ends of the longitudinally-arranged rods and loops carried by the said transverse block, adapted to receive a shaft, whereby the inclined plane is adapted to swing from said point, substantially as described.

4. A potato-digger comprising a frame, a plow attached thereto, an inclined endless conveyer extending from the upper end of the plow, an inclined plane comprising side boards connected by transverse bars, the lower end of said conveyer being pivoted, an angular shaft below the upper end of said conveyer and driven thereby, and each side board having a downwardly-projecting arm resting on said angular shaft in a plane, whereby when the shaft revolves both sides of the plane rise and fall simultaneously, substantially as described.

In testimony whereof we have hereunto set our hands in the presence of two subscribing witnesses.

JOHN RADERMACHER.
PETER RADERMACHER.

Witnesses:
RICHARD O'CONNOR,
S. C. GARVEY.